United States Patent
Lee et al.

(10) Patent No.: US 11,631,915 B2
(45) Date of Patent: *Apr. 18, 2023

(54) GASKET FOR SECONDARY BATTERY, AND SECONDARY BATTERY INCLUDING THE SAME

(71) Applicant: LG Energy Solution, Ltd., Seoul (KR)

(72) Inventors: Byoung Gu Lee, Daejeon (KR); Do Gyun Kim, Daejeon (KR); Sang Suk Jung, Daejeon (KR); Hang Soo Shin, Daejeon (KR); Chan Bae Kim, Daejeon (KR)

(73) Assignee: LG Energy Solution, Ltd.

( * ) Notice: Subject to any disclaimer, the term of this patent is extended or adjusted under 35 U.S.C. 154(b) by 269 days.

This patent is subject to a terminal disclaimer.

(21) Appl. No.: 16/954,791

(22) PCT Filed: Feb. 25, 2019

(86) PCT No.: PCT/KR2019/002287
§ 371 (c)(1),
(2) Date: Jun. 17, 2020

(87) PCT Pub. No.: WO2019/164371
PCT Pub. Date: Aug. 29, 2019

(65) Prior Publication Data
US 2021/0091434 A1    Mar. 25, 2021

(30) Foreign Application Priority Data

Feb. 23, 2018 (KR) .................. 10-2018-0022063
Feb. 25, 2019 (KR) .................. 10-2019-0021676

(51) Int. Cl.
*H01M 50/193* (2021.01)
*C08L 67/02* (2006.01)

(52) U.S. Cl.
CPC .......... *H01M 50/193* (2021.01); *C08L 67/02* (2013.01); *C08L 2205/14* (2013.01)

(58) Field of Classification Search
None
See application file for complete search history.

(56) References Cited

U.S. PATENT DOCUMENTS 5,507,861 A    4/1996    Caupin et al.
6,025,091 A    2/2000    Kondo et al.
(Continued)

FOREIGN PATENT DOCUMENTS

CN    101457363 A    6/2009
CN    103361651 A    10/2013
(Continued)

OTHER PUBLICATIONS

International Search Report for Application No. PCT/KR2019/002287 dated Jun. 4, 2019, 3 pages.
(Continued)

*Primary Examiner* — Carlos Barcena
(74) *Attorney, Agent, or Firm* — Lerner, David, Littenberg, Krumholz & Mentlik, LLP (57) ABSTRACT

A gasket for a secondary battery includes a base resin and a rust inhibitor, wherein the base resin includes polybutylene terephthalate and the rust inhibitor includes an anti-rust material and a polymer resin, and the base resin and the polymer resin are different.

8 Claims, 3 Drawing Sheets

(56) References Cited

U.S. PATENT DOCUMENTS

| | | |
|---|---|---|
| 6,488,749 B1 | 12/2002 | Fukutani et al. |
| 2004/0118482 A1 | 6/2004 | Steinmetz et al. |
| 2009/0151598 A1 | 6/2009 | Reinhard et al. |
| 2011/0104549 A1 | 5/2011 | Kim |
| 2013/0030103 A1 | 1/2013 | Hasegawa |
| 2013/0273401 A1 | 10/2013 | Lee et al. |
| 2015/0065634 A1 | 3/2015 | Pineau et al. |
| 2016/0099439 A1 | 4/2016 | Lee et al. |
| 2019/0078216 A1 | 3/2019 | Hamada et al. |

FOREIGN PATENT DOCUMENTS

| | | | |
|---|---|---|---|
| CN | 103650199 A | 3/2014 | |
| CN | 103959514 A | 7/2014 | |
| CN | 103992540 A | 8/2014 | |
| JP | H10302737 A | 11/1998 | |
| JP | 2009032639 A | 2/2009 | |
| JP | 2009197322 A | 9/2009 | |
| JP | 2014524118 A | 9/2014 | |
| JP | 2016076483 A | 5/2016 | |
| KR | 960007699 B1 | 6/1996 | |
| KR | 20010055181 A | 7/2001 | |
| KR | 20010089813 A | 10/2001 | |
| KR | 100871674 B1 | 12/2008 | |
| KR | 101093339 B1 | 12/2011 | |
| KR | 20150026859 A | 3/2015 | |
| KR | 20160043724 A | 4/2016 | |
| KR | 20160049537 A | 5/2016 | |
| KR | 20170004042 A | 1/2017 | |
| WO | WO 8607077 | * 12/1986 | ............ C23F 11/02 |
| WO | 2011129168 A1 | 10/2011 | |
| WO | 2013176024 A1 | 11/2013 | |
| WO | 2017199865 A1 | 11/2017 | |

OTHER PUBLICATIONS

Extended European Search Report including Written Opinion for Application No. 19757420.5 dated Feb. 8, 2021, pp. 1-7.

Search Report dated Jan. 21, 2022 from the Office Action for Chinese Application No. 2019800062795 dated Jan. 28, 2022, 3 pgs.

* cited by examiner

GASKET FOR SECONDARY BATTERY, AND SECONDARY BATTERY INCLUDING THE SAME

CROSS-REFERENCE TO RELATED APPLICATIONS

This application is a national stage entry under 35 U.S.C. § 371 of International Application No. PCT/KR2019/002287, filed Feb. 25, 2019, which claims the benefit of Korean Patent Application No. 10-2018-0022063, filed on Feb. 23, 2018, and Korean Patent Application No. 10-2019-0021676, filed Feb. 25, 2019, the disclosures of which are incorporated herein by reference.

TECHNICAL FIELD

The present invention relates to a gasket for a secondary battery and a secondary battery including the same.

BACKGROUND ART

In general, unlike a primary battery which is not chargeable, a secondary battery refers to a battery chargeable and dischargeable, and is widely used as a power source of electronic devices such as a cell phone, a notebook computer, and a camcorder, or of an electric vehicle and the like. Particularly, a lithium secondary battery has a driving voltage of 3.6 V, and has a capacity of approximately three times more than a nickel-cadmium battery or a nickel-hydrogen battery, which are widely used as a power source of electronic equipment. Since a lithium secondary battery has high energy density per unit weight, the utilization thereof is rapidly increasing.

The lithium secondary battery usually uses a lithium-based oxide and a carbon material as a positive electrode active material and a negative electrode active material, respectively. In addition, a lithium secondary battery may be classified into a square-shaped battery, a cylindrical battery, and a pouch-shaped battery.

A lithium ion secondary battery is provided with an electrode assembly in which a positive electrode/a separator/a negative electrode are sequentially disposed and an exterior material for sealing and receiving the electrode assembly together with an electrolyte. Particularly, the exterior material is provided with a can having an open end and a cap assembly sealed and coupled to the open end of the can.

In general, a gasket is interposed between the can and the cap assembly to seal a battery. As the gasket of the battery, a layer of a polymer resin such as polypropylene has been used. However, there has been a problem in that a crimping part of the battery, for example, a trimming part in which Fe is exposed, rusts in a high temperature/high humidity atmosphere, so that there has been a demand for solving the problem.

DISCLOSURE OF THE INVENTION

Technical Problem

An aspect of the present invention provides a gasket for a secondary battery and a secondary battery including the same, the gasket capable of minimizing the generation of rust in a crimping part of a battery in a high temperature/high humidity atmosphere, and having improved sealing properties.

Technical Solution

According to an aspect of the present invention, there is provided a gasket for a secondary battery including a base resin and a rust inhibitor, wherein the base resin includes polybutylene terephthalate and the rust inhibitor includes an anti-rust material and a polymer resin, and the base resin and the polymer resin are different, and the anti-rust material includes at least one of compounds of Formula 1-1 or Formula 1-2 below.

$A_1\text{-}R_1$ [Formula 1-1]

$A_1\text{-}R_2\text{-}A_2$ [Formula 1-2]

wherein $R_1$ is any one selected from the group consisting of a linear alkyl group having 8 to 20 carbon atoms, a branched alkyl group having 8-20 carbon atoms, an alkenyl group having 8 to 20 carbon atoms, alkynyl group having 8 to 20 carbon atoms, and an aryl group having 8 to 18 carbon atoms;

$R_2$ is any one selected from the group consisting of a linear alkylene group having 8 to 20 carbon atoms, a branched alkylene group having 8 to 20 carbon atoms, an alkenylene group having 8 to 20 carbon atoms, alkynylene having 8 to 20 carbon atoms, and an arylene group having 8 to 18 carbon atoms; and $A_1$ and $A_2$ are each independently any one selected from the group consisting of a carboxyl group, an amino group, a nitro group, a hydroxy group, and a fluorine group.

According to another aspect of the present invention, there is provided a secondary battery including an electrode assembly including a positive electrode and a negative electrode, a can including a top opening, a cap assembly coupled to the can by a crimping part which is formed on an upper outer circumferential surface of the can, wherein a portion of the top opening is bent inward to form the crimping part, and the gasket for a secondary battery, wherein the gasket for a secondary battery is interposed between the can and the cap assembly.

Advantageous Effects

A gasket for a secondary battery according to an embodiment of the present invention includes a specific anti-rust material, and the anti-rust material is evaporated and absorbed to a crimping part, particularly a portion in which Fe is exposed in a top opening of a can, to prevent the Fe from directly contacting moisture and oxygen. Accordingly, it is possible to minimize the generation of rust in a crimping part of a battery in a high temperature/high humidity atmosphere. In addition, in the present invention, polybutylene terephthalate (PBT) is used as a base resin, so that the heat resistance and sealing properties of the gasket may be improved. Also, the specific anti-rust material is injected with polybutylene terephthalate which has a high injection temperature. At this time, the structure of the specific anti-rust material does not break down even at the high injection temperature, so that the anti-rust properties of the anti-rust material may be maintained in a finally manufactured gasket.

In addition, the specific anti-rust material is present in the gasket by being dispersed in a small size at an angstrom (Å) level, and thus, when evaporated, voids generated in the gasket are formed to be small at a negligible level. Therefore, when compared with a case in which a typical anti-rust material present in a gasket by being dispersed in a large size at a micro (μm) level is used, the sealing properties of the gasket of the present invention may be maintained.

BEST MODE FOR CARRYING OUT THE INVENTION

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A gasket for a secondary battery according to an embodiment of the present invention includes a base resin and a rust inhibitor, wherein the base resin includes polybutylene terephthalate and the rust inhibitor includes an anti-rust material and a polymer resin, and the base resin and the polymer resin are different, and the anti-rust material includes at least one of compounds of Formula 1-1 or Formula 1-2 below.

$$A_1\text{-}R_1 \qquad \text{[Formula 1-1]}$$

$$A_1\text{-}R_2\text{-}A_2 \qquad \text{[Formula 1-2]}$$

wherein $R_1$ is any one selected from the group consisting of a linear alkyl group having 8 to 20 carbon atoms, a branched alkyl group having 8-20 carbon atoms, an alkenyl group having 8 to 20 carbon atoms, alkynyl group having 8 to 20 carbon atoms, and an aryl group having 8 to 18 carbon atoms;

$R_2$ is any one selected from the group consisting of a linear alkylene group having 8 to 20 carbon atoms, a branched alkylene group having 8 to 20 carbon atoms, an alkenylene group having 8 to 20 carbon atoms, alkynylene having 8 to 20 carbon atoms, and an arylene group having 8 to 18 carbon atoms; and $A_1$ and $A_2$ are each independently any one selected from the group consisting of a carboxyl group, an amino group, a nitro group, a hydroxy group, and a fluorine group.

The rust inhibitor may be a volatile corrosion inhibitor (VCI). The rust inhibitor is evaporated and absorbed to a crimping part, particularly a trimming part in which Fe is exposed in a top opening of a can, to prevent the Fe from directly contacting moisture and oxygen.

The rust inhibitor may be present in the base resin of the gasket by being dispersed in molecular units.

The anti-rust material may include at least one of compounds of Formula 1-1 or Formula 1-2 below.

$$A_1\text{-}R_1 \qquad \text{[Formula 1-1]}$$

$$A_1\text{-}R_2\text{-}A_2 \qquad \text{[Formula 1-2]}$$

wherein $R_1$ is any one selected from the group consisting of a linear alkyl group having 8 to 20 carbon atoms, a branched alkyl group having 8-20 carbon atoms, an alkenyl group having 8 to 20 carbon atoms, alkynyl group having 8 to 20 carbon atoms, and an aryl group having 8 to 18 carbon atoms;

$R_2$ is any one selected from the group consisting of a linear alkylene group having 8 to 20 carbon atoms, a branched alkylene group having 8 to 20 carbon atoms, an alkenylene group having 8 to 20 carbon atoms, alkynylene having 8 to 20 carbon atoms, and an arylene group having 8 to 18 carbon atoms; and $A_1$ and $A_2$ are each independently any one selected from the group consisting of a carboxyl group, an amino group, a nitro group, a hydroxy group, and a fluorine group.

When compounds according to Formula 1-1 and Formula 1-2 are used, $A_1$ and/or $A_2$ are electrically and/or chemically absorbed to the crimping part, particularly a portion in which Fe is exposed in the top opening of the can, and $R_1$ and/or $R_2$ may form a hydrophobic layer to prevent the Fe from directly contacting moisture and oxygen. Accordingly, it is possible to minimize the generation of rust in the crimping part of a battery under high temperature/high humidity conditions.

Meanwhile, the gasket for a secondary battery of the present invention is manufactured by a method of injecting a base resin containing polybutylene terephthalate and the rust inhibitor at a high temperature. The injection temperature of the polybutylene terephthalate is high, which is about 280° C. However, the structure of the anti-rust material used in the present invention does not break down even at the injection temperature. Accordingly, the anti-rust effect by the anti-rust material may be maintained even in a finally manufactured gasket.

More specifically, the anti-rust material may include at least one of Formula 1-3 or Formula 1-4 below.

[Formula 1-3]

[Formula 1-4]

wherein, in Formula 1-3 and Formula 1-4, $A_1$ is the same as $A_1$ in Formula 1-1 and Formula 1-2, and p may be 4 to 10 and q may be 3 to 6.

The anti-rust material of Formula 1-3 and Formula 1-4 may exhibit the anti-rust effect described above, and the structure thereof is not deformed at an injection temperature of the base resin containing polybutylene terephthalate. In addition, the deterioration of the sealing properties of the gasket may be minimized for the following reasons.

Typically, materials such as $NaNO_2$ and $NaNO_3$, which are used as anti-rust materials, are present in a resin by being dispersed in a large unit at a micro (μm) level. Therefore, when the materials are evaporated, large voids are generated in the resin constituting a gasket. Accordingly, moisture and oxygen from the outside may penetrate into a battery through the voids, so that the sealing properties of the gasket may be deteriorated and battery performance may be deteriorated. On the other hand, the anti-rust materials of Formula 1-3 and Formula 1-4 are present in the gasket by being dispersed in a small size at an angstrom (Å) level, and thus, when evaporated, voids generated in the gasket are formed to be small at a negligible level. Therefore, the deterioration of the sealing properties of the gasket may be minimized.

More specifically, the anti-rust material may include at least one selected from the group consisting of decanoic acid, lauric acid, and myristic acid. When the anti-rust material is used, the anti-rust effect described above may be exhibited, and the structure thereof is not deformed at an injection temperature of the base resin containing polybutylene terephthalate. In addition, the deterioration of the sealing properties of the gasket may be minimized.

The polymer resin is mixed with the anti-rust material, and may serve to disperse the anti-rust material in the base resin. In order to facilitate the dispersion of the anti-rust material in the base resin, the polymer resin may be different from the base resin.

The polymer resin may include at least one of polyethylene or a copolymer which includes 2 or more derived units selected from the group consisting of an ethylene-derived unit, a propylene-derived unit, a butylene terephthalate-derived unit, an ethylene terephthalate-derived unit, and a methyl acrylate-derived unit. Specifically, the materials may be mixed and used. The polymer resin is preferable since the polymer resin is easily mixed with the anti-rust material and also easily mixed with polybutylene terephthalate. In addition, the polymer resin may further improve the anti-rust properties of the gasket. Specifically, when considering the manufacturing process and the mixing with the base resin, the polymer resin may be a copolymer including an ethylene-derived unit and a methyl acrylate-derived unit.

The weight ratio of the polymer resin to the anti-rust material may be 99:1 to 80:20, specifically 99:1 to 85:15, more specifically 99:1 to 90:10. When the above range is satisfied, the anti-rust effect may be more effective.

The rust inhibitor may be in the form of a pellet. Specifically, the rust inhibitor may be in the form of a pellet formed by mixing the polymer resin and the anti-rust material and then subjecting the mixture to a pelletizing process. As a result, the rust inhibitor may be smoothly dispersed in the base resin. When only an anti-rust material not in a pellet form (that is, without a polymer resin) is mixed with a base resin, the anti-rust material is not smoothly dispersed in the base resin, so that an anti-rust function is rapidly deteriorated.

The base resin may include polybutylene terephthalate (PBT), and specifically, may be polybutylene terephthalate. The polybutylene terephthalate has high heat resistance and low oxygen and moisture permeability, and thus, is more preferable as the base resin of the gasket. Specifically, when polypropylene having a low melting point of about 160° C. is used as the base resin, the polypropylene melts when a positive electrode and a negative electrode are short-circuited, so that the stability of the battery is deteriorated. On the other hand, the polybutylene terephthalate has a high melting point of about 230° C., so that the gasket is maintained and the stability of the battery may be secured.

Furthermore, in the case in which the base resin is polybutylene terephthalate, when the anti-rust material included in the rust inhibitor for a gasket is used, the following advantages may be obtained. Anti-rust materials, such as $NaNO_2$ and $NaNO_3$ which are typically used as anti-rust materials, weaken a C=O bond included in the polybutylene terephthalate, thereby deteriorating the polybutylene terephthalate, so that the physical properties of the gasket are deteriorated. Specifically, the ductility of the polybutylene terephthalate is deteriorated, so that cracks are likely to be generated in the gasket by external force. However, the anti-rust material of the present invention may minimize the weakening of the C=O bond included in the polybutylene terephthalate, or has no effect on the bonding, so that the physical properties of the gasket may be maintained. Also, the polybutylene terephthalate has a high injection temperature of 280° C., and the structure of the anti-rust material of the present invention injected together with the polybutylene terephthalate does not break down even at the high temperature, so that the anti-rust properties of the anti-rust material may be maintained in a finally manufactured gasket.

The weight ratio of the polybutylene terephthalate to the rust inhibitor may be 98:2 to 85:15, specifically 98:2 to 90:10, more specifically 93:7 to 90:10. When the above range is satisfied, the anti-rust effect described above may be more improved.

A secondary battery according to another embodiment of the present invention includes an electrode assembly including a positive electrode and a negative electrode, a can including a top opening, a cap assembly coupled to the can by a crimping part which is formed on an upper outer circumferential surface of the can, wherein a portion of the top opening is bent inward to form the crimping part, and a gasket for a secondary battery, wherein the gasket for a secondary battery may be interposed between the can and the cap assembly. Here, the gasket for a secondary battery is the same as the gasket for a secondary battery of the embodiment described above, and therefore, a description thereof will be omitted.

The secondary battery may have a cylindrical shape, a square shape, and the like, and specifically, may have a cylindrical shape. When the secondary battery has a cylindrical shape, the top opening of the can may also have a cylindrical shape.

Figure 1:
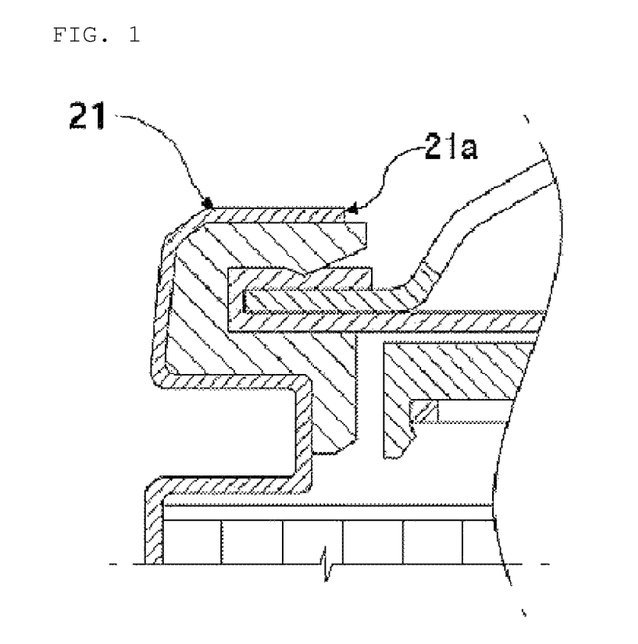
FIG. 1 is a cross-sectional view illustrating one surface of a secondary battery having a gasket for a secondary battery according to an embodiment of the present invention.
Figure 2:
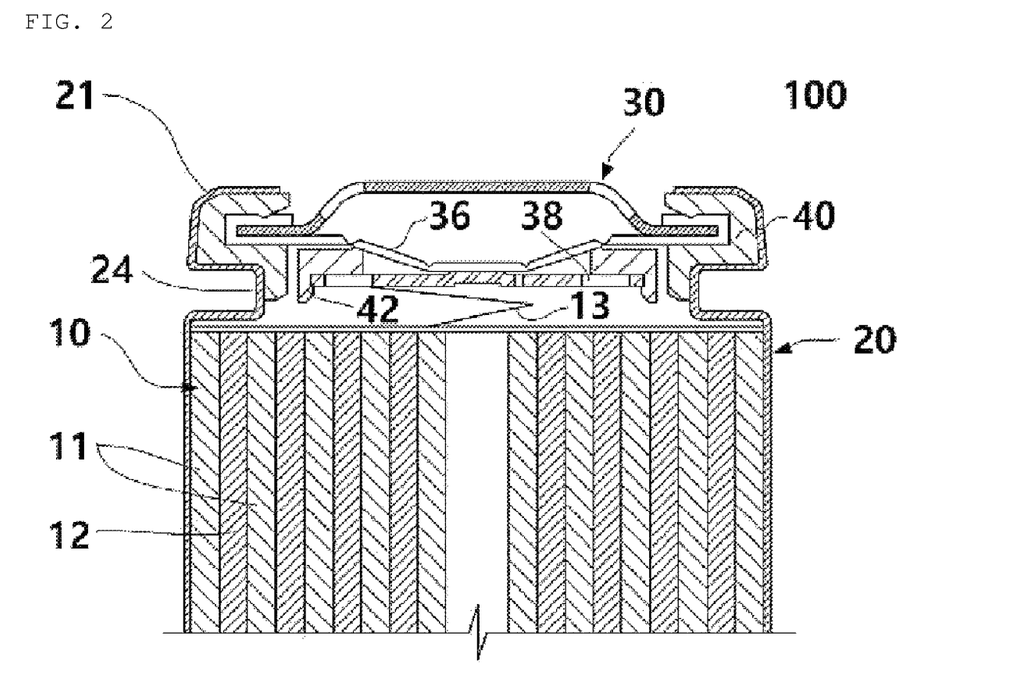
FIG. 2 is a cross-sectional view illustrating a secondary battery having a gasket for a secondary battery according to an embodiment of the present invention.

Referring to FIG. 1 and FIG. 2, a secondary battery 100 includes a can 20 receiving an electrode assembly 10 together with an electrolyte, a cap assembly 30 sealed and coupled to an open end of the can 20, and a gasket 40 interposed between the can 20 having a cylindrical shape and the cap assembly 30. The gasket 40 is the same as the gasket for a secondary battery of the embodiment described above.

The material of the can 20 is not particularly limited. The can 20 may be formed of at least one among stainless steel, steel, aluminum, or an equivalent thereof. Since the can 20 is required to have conductivity, a metal component is used, and the metal component may be susceptible to corrosion caused by the contact with moisture from the outside. In this respect, the can 20 may include a layer made of Fe and a layer made of Ni for preventing the layer made of Fe from corrosion.

The can 20 may have a cylindrical shape, a square shape, and the like, and specifically, may have a cylindrical shape. The open end of the can 20 includes a trimming part 21a, and in the trimming part 21a, a Fe component of the can 20 may be exposed. Specifically, in a final product, the trimming part 21a may be seen to be included in a crimping part 21.

The cap assembly 30 may include a top cap for sealing the open end of the can 20 and a safety vent 36. One surface of the safety vent 36 may be disposed to come in contact with side surfaces, top surface, and bottom surface of the top cap, and the other surface thereof may be bent and disposed so as to come in contact with an inner surface of the gasket 40. The safety vent 36 may be electrically connected to the electrode assembly 10. A battery having the cap assembly 30 may provide a high output instantaneously when used as a power source of a power tool such as an electric drill, and may be stable against external physical impact such as vibration and fall.

Particularly, in the cap assembly 30 having a shape in which the safety vent 36 is bent to surround the top cap, a contact surface of the safety vent 36 and the top cap may form one or more connection portions, and the connection portions are formed by welding and the like. The term "welding" used in the present invention is used as a concept including not only a literal meaning of welding such as laser welding, ultrasonic welding, and resistance welding, but also a fastening method such as soldering. The welding may be performed in an assembly process of the cap assembly 30 itself, or may be performed even when the cap assembly 30 is installed in the can 20.

The safety vent 36 serves to shut off current or exhaust gas when pressure rises inside the battery, and may be preferably made of a metal material. The thickness of the safety vent 36 may vary depending on the material and the structure thereof, and is not particularly limited as long as the safety vent 36 may discharge gas and the like while rupturing when a predetermined high pressure is generated in the battery. For example, the thickness of the safety vent 36 may be 0.2-0.6 mm.

The thickness of the top cap portion which is in contact with the safety vent 36 is not particularly limited as long as it is in the range capable of protecting various components of the cap assembly 30 from pressure applied from the outside. For example, the thickness of the top cap portion may be 0.3-0.5 mm. If the top cap portion is too thin, it is difficult to exert mechanical stiffness. On the contrary, if the top cap portion is too thick, it is not preferable because the capacity of the battery may be reduced compared to a battery of the same standard due to the increase in size and weight.

The gasket 40 may form a cylindrical shape or a square shape in which both ends are open, or have a shape which varies depending on the shape of the top opening of the can 20. Specifically, the gasket 40 may have a cylindrical shape. It is preferable that one side end of the gasket 40 facing an inner surface of the can 20 has a structure of being bent at a predetermined angle toward a center portion, specifically at a right angle, to be placed in an open portion of the can 20, that is, the crimping part 21. The other side end of the gasket 40 is initially spread in a straight line facing an axial direction of the gasket 40, and then is bent at a predetermined angle toward the center portion during the pressing process of the can 20 such that and an inner circumferential surface and an outer circumferential surface are folded in the state of being in close contact with the top cap of the cap assembly 30 and an inner surface of the can 20, respectively.

The crimping part 21 is formed on the top of the can 20 such that the cap assembly 30 may be mounted on the open end of the can 20. More specifically, the crimping part 21 is formed by beading a top portion of the can 20 so as to form an indentation inward, mounting the gasket 40 on the open end, inserting the top cap, a PTC element, and an outer circumferential surface of the safety vent (36) in turn, and then bending the top portion of the can 20 inward. As a result, the top portion of the can 20 has a shape of surrounding the gasket 40 which is positioned on the inner surface of the crimping part 21, and crimping and pressing processes are performed to mount the cap assembly 30.

The crimping part 21 is formed in a structure in which an end portion is bent inward such that the cap assembly 30 may be stably mounted on an open top of the can when the gasket 40 is interposed. A side wall of the crimping part 21 is formed so as to be perpendicular to a side surface of the battery.

The electrode assembly 10 may include a positive electrode and a negative electrode. Referring to FIG. 2, the electrode assembly 10 has two electrode plates 11 having different polarities and having a wide plate shape in the form of a roll, and a separator 12 disposed either between the electrode plates 11 or disposed on the left or right sides of one electrode plate 11 so as to insulate the electrode plates 11. At this time, the electrode plates 11 spaced apart from each other by the separator 12 may be a positive electrode and a negative electrode. It is preferable that the electrode assembly 10 has a structure of being wound in the form of a so-called 'Jelly Roll.' The electrode assembly 10 may also be in the shape in which a positive electrode plate and a negative electrode plate of a predetermined size are laminated having the separator 12 therebetween.

In the inner space of the can 20, the electrode assembly 10 and an electrolyte (not shown) are received. The electrolyte is to move lithium ions generated by an electrochemical reaction of the electrode plates 11 during charging and discharging of the secondary battery 100. The electrolyte may be a non-aqueous organic electrolyte which is a mixture of a lithium salt and a high-purity organic solvent or a polymer using a polyelectrolyte. However, the kind of the electrolyte is not particularly limited.

Meanwhile, in the center of the can 20, a center pin (not shown) may be inserted, the center pin for preventing the electrode assembly 10 wound in the form of a jelly roll from being unwound and for serving as a moving path of gas inside the secondary battery 100. An upper portion of the can 20, that is, an upper portion of the top of the electrode assembly 10, is provided with a beading part 24 formed by press-bending from the outside to the inside to prevent upward and downward movement of the electrode assembly 10.

The cylindrical battery 100 according to an embodiment of the present invention may further include an auxiliary gasket 42. The auxiliary gasket 42 is a gasket for a current shutoff element 38 and is configured to surround an outer circumferential surface of the current shutoff element 38. Particularly, the auxiliary gasket 42 comes in contact with an upper portion and a side portion from the outer circumferential surface of the current shutoff element 38 to support the upper portion and the side portion of the current shutoff element 38. In addition, the auxiliary gasket 42 serves such that the current shutoff element 38 and the safety vent 36 are electrically insulated from each other except for a portion in which a protruding portion of the safety vent 36 and the current shutoff element 38 are in contact with each other.

Figure 3:
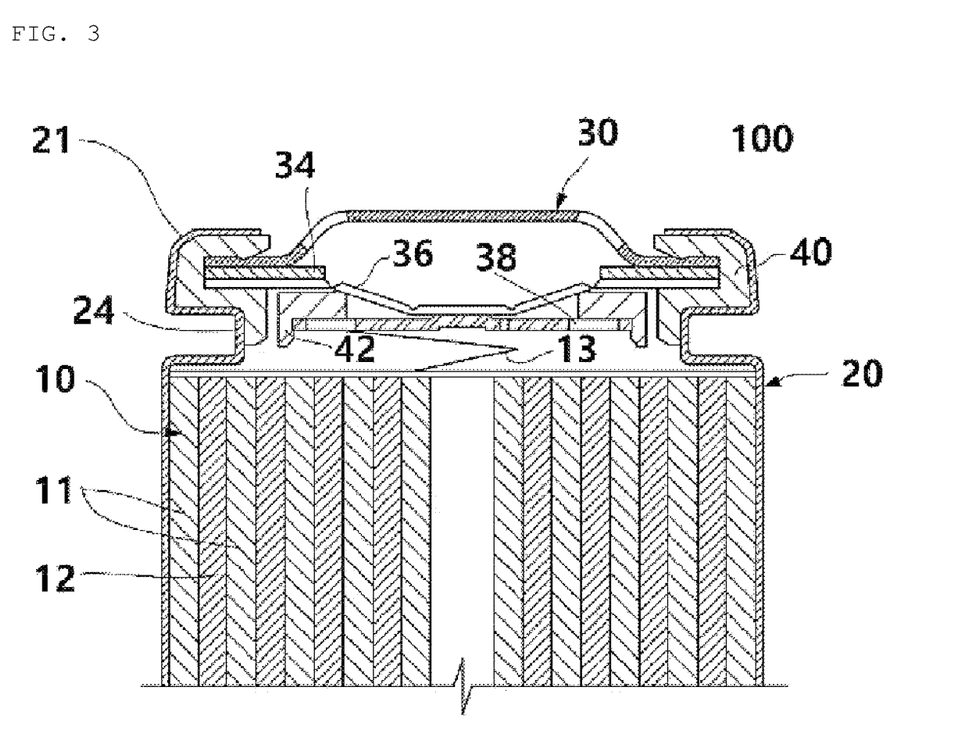
FIG. 3 is a cross-sectional view illustrating a secondary battery having a gasket for a secondary battery according to another embodiment of the present invention.

A battery 100 according to another embodiment of the present invention is shown in FIG. 3. The same components as the reference numerals described with reference to FIG. 2 are the same members with the same functions. Referring to FIG. 3, a cap assembly 30 may include a top cap disposed to seal an open end of a can 20 and to be in contact with a protruding portion of a gasket 40, a positive temperature coefficient (PTC) element 34 disposed so as to be in contact with the top cap, and a safety vent 36 in which one surface thereof is disposed to be in contact with the PTC element 34 and a portion of the other surface thereof is disposed to be in contact with the gasket 40.

The PTC element 34 serves to shut off current by greatly increasing battery resistance when the temperature inside the battery 100 rises. The thickness of the PTC element 34 may also vary depending on the material and the structure thereof, and may be, for example, 0.2 mm to 0.4 mm. When the thickness of the PTC element 34 is greater than 0.4 mm, internal resistance increases and the size of the battery is increased, so that the capacity of the battery may be reduced compared to a battery of the same standard. On the contrary, when the thickness of the PTC element 34 is less than 0.2 mm, it is difficult to exhibit a desired current shutoff effect at a high temperature, and the PTC element 34 may be destroyed even by a weak external impact. Accordingly, the thickness of the PTC element 34 may be appropriately determined within the above thickness range in consideration of the above points in combination.

The thickness of a top cap portion which is in contact with the PTC element 34 is not particularly limited as long as it is in the range capable of protecting various components of the cap assembly 30 from pressure applied from the outside. For example, the thickness may be 0.3-0.5 mm. If the top cap portion is too thin, it is difficult to exert mechanical stiffness. On the contrary, if the top cap portion is too thick, it is not preferable because the capacity of the battery may be reduced compared to a battery of the same standard due to the increase in size and weight.

A secondary battery including the cap assembly 30 provided with the top cap, the PTC element 34, and the safety vent 36 may be used as a power source of a cell phone, a notebook computer and the like, which stably supplies a constant output.

The present invention may provide a battery pack in which a plurality of lithium secondary batteries manufactured by the above embodiment are electrically connected to each other, and the battery pack may be a battery pack used as a power source for a medium-and-large sized device in one or more devices selected from the group consisting of a power tool, an electric vehicle including an electric vehicle (EV), a hybrid electric vehicle (HEV), and a plug-in hybrid electric car (PHEV), an electric truck, an electric commercial vehicle, or a power storage system.

Hereinafter, with reference to examples and comparative examples, the present invention will be described in more detail. However, the following examples are merely illustrative of the present invention and the scope of the present invention is not limited thereto.

Example 1: Manufacturing of Battery (1) Manufacturing of Gasket

A copolymer including an ethylene-derived unit and methyl acrylate-derived unit and lauric acid were mixed in a weight ratio of 95:5 at 100° C., and then the mixture was subjected to a pelletizing process to prepare a rust inhibitor in the form of a pellet. 240 g of the rust inhibitor and 3,000 g of polybutylene terephthalate were mixed, and then the mixture was injected at a temperature of 280° C. to prepare a gasket.

(2) Manufacturing of Battery

A can is composed of an inner layer made of Fe and an Ni layer disposed on both surfaces of the inner layer. After disposing the gasket on a top opening of the can, a cap assembly was placed to be in contact with an inner circumferential surface of the gasket, and then a crimping part was formed. As a result, a battery including the gasket was manufactured.

Example 2: Manufacturing of Battery (1) Manufacturing of Gasket

A copolymer including an ethylene-derived unit and methyl acrylate-derived unit and lauric acid were mixed in a weight ratio of 95:5 at 100° C., and then the mixture was subjected to a pelletizing process to prepare a rust inhibitor in the form of a pellet. 150 g of the rust inhibitor and 3,000 g of polybutylene terephthalate were mixed, and then the mixture was injected at a temperature of 280° C. to prepare a gasket.

(2) Manufacturing of Battery

A can is composed of an inner layer made of Fe and an Ni layer disposed on both surfaces of the inner layer. After disposing the gasket on a top opening of the can, a cap assembly was placed to be in contact with an inner circumferential surface of the gasket, and then a crimping part was formed. As a result, a battery including the gasket was manufactured.

Example 3: Manufacturing of Battery (1) Manufacturing of Gasket

A copolymer including an ethylene-derived unit and methyl acrylate-derived unit and decanoic acid were mixed in a weight ratio of 95:5 at 100° C., and then the mixture was subjected to a pelletizing process to prepare a rust inhibitor in the form of a pellet. 240 g of the rust inhibitor and 3,000 g of polybutylene terephthalate were mixed, and then the mixture was injected at a temperature of 280° C. to prepare a gasket.

(2) Manufacturing of Battery

A can is composed of an inner layer made of Fe and an Ni layer disposed on both surfaces of the inner layer. After disposing the gasket on a top opening of the can, a cap assembly was placed to be in contact with an inner circumferential surface of the gasket, and then a crimping part was formed. As a result, a battery including the gasket was manufactured.

Comparative Example 1: Manufacturing of Battery (1) Manufacturing of Gasket

Polybutylene terephthalate was injected at 280° C. to prepare a gasket.

(2) Manufacturing of Battery

A can is composed of an inner layer made of Fe and an Ni layer disposed on both surfaces of the inner layer. After disposing the gasket on a top opening of the can, a cap assembly was placed to be in contact with an inner circumferential surface of the gasket, and then a crimping part was formed. As a result, a battery including the gasket was manufactured.

Comparative Example 2: Manufacturing of Battery (1) Manufacturing of Gasket

Polyethylene and $NaNO_2$ were mixed in a weight ratio of 70:30 at 140° C., and then the mixture was subjected to a pelletizing process to prepare a rust inhibitor in the form of a pellet. 240 g of the rust inhibitor and 3,000 g of polybutylene terephthalate were mixed, and then the mixture was injected at a temperature of 280° C. to prepare a gasket.

(2) Manufacturing of Battery

A can is composed of an inner layer made of Fe and an Ni layer disposed on both surfaces of the inner layer. After disposing the gasket on a top opening of the can, a cap assembly was placed to be in contact with an inner circumferential surface of the gasket, and then a crimping part was formed. As a result, a battery including the gasket was manufactured.

Comparative Example 3: Manufacturing of Battery (1) Manufacturing of Gasket

A copolymer including an ethylene-derived unit and methyl acrylate-derived unit and lauric acid were mixed in a weight ratio of 95:5 at 100° C., and then the mixture was subjected to a pelletizing process to prepare a rust inhibitor in the form of a pellet. 240 g of the rust inhibitor and 3,000 g of poly-tetrafluoroethylene (PFA) were mixed, and then the mixture was injected at a temperature of 380° C. to prepare a gasket.

(2) Manufacturing of Battery

A can is composed of an inner layer made of Fe and an Ni layer disposed on both surfaces of the inner layer. After disposing the gasket on a top opening of the can, a cap assembly was placed to be in contact with an inner circumferential surface of the gasket, and then a crimping part was formed. As a result, a battery including the gasket was manufactured.

Comparative Example 4: Manufacturing of Battery (1) Manufacturing of Gasket 12 g of lauric acid and 3,228 g of polybutylene terephthalate were mixed, and then the mixture was injected at a temperature of 280° C. to prepare a gasket.

(2) Manufacturing of Battery

A can is composed of an inner layer made of Fe and an Ni layer disposed on both surfaces of the inner layer. After disposing the gasket on a top opening of the can, a cap assembly was placed to be in contact with an inner circumferential surface of the gasket, and then a crimping part was formed. As a result, a battery including the gasket was manufactured.

Experimental Example 1: Evaluation of Anti-Rust Function

The battery of each of Examples 1 to 3 and Comparative Examples 1 to 4 was stored for 2 weeks in the environment of 65° C. and 90% humidity, the anti-rust function thereof was evaluated. The evaluation results are shown in Table 1.

Specifically, based on the region of a trimming part of an upper outer circumferential surface of the can, the ratio of a region in which corrosion occurred was represented by %. When the region in which corrosion occurred was greater than 50%, 3 points were given. When greater than 10% and 50% or less, 2 points were given, and when 10% or less, 1 point was given. When there was no corrosion, 0 point was given. After scoring 30 batteries in the manner described above, the average value of the scores was converted to a score of 10 (average value×(10/3)) to evaluate an anti-rust function with the final score derived therefrom. Meanwhile, the regions in which corrosion occurred were confirmed with the naked eye and a microscope.

TABLE 1

|  | Anti-rust function evaluation score |
| --- | --- |
| Example 1 | 0.4 |
| Example 2 | 1.1 |
| Example 3 | 0.5 |
| Comparative Example 1 | 9.7 |
| Comparative Example 2 | 1.9 |
| Comparative Example 3 | 10.0 |
| Comparative Example 4 | 4.9 |

Referring to Table 1, in the case of Examples 1 to 3 in which the rust inhibitor for a gasket of the present invention was used, the anti-rust function was confirmed to be much better than Comparative Example 1 in which a rust inhibitor was not used and Comparative Example 2 in which a typical rust inhibitor containing $NaNO_2$ was used.

Meanwhile, in the case of Comparative Example 3 in which PFA instead of polybutylene terephthalate was used as the base resin, since the base resin has a high melting point, the rust inhibitor contained in the base resin was mostly pyrolyzed, so that the anti-rust function was confirmed to be deteriorated. In addition, when a rust inhibitor is composed of only an anti-rust material without a polymer resin, due to the difference in specific gravity between the base resin and the rust inhibitor, the anti-rust material was not uniformly dispersed in the gasket, so that the anti-rust function was confirmed to be deteriorated.

Experimental Example 2: Evaluation of Sealing Function

The battery of each of Example 1 and Comparative Examples 1 to 4 was stored for 40 days at a temperature of 72° C. in an SOC 100% state. The weight of the battery before and after the storage were measured, and the measurement results are shown in Table 2. The weight change rate of Table 2 was calculated by the following equation.

Weight change rate=[(battery weight before storage−battery weight after storage)/battery weight before storage]×100

TABLE 2

|  | Battery weight before storage (g) | Battery weight after storage (g) | Weight change Rate (%) |
| --- | --- | --- | --- |
| Example 1 | 48.03 | 48.02 | 0.0208 |
| Comparative Example 1 | 47.90 | 47.89 | 0.0209 |
| Comparative Example 2 | 47.97 | 47.27 | 1.4592 |
| Comparative Example 3 | 47.94 | 47.92 | 0.0417 |
| Comparative Example 4 | 47.99 | 47.98 | 0.0208 |

Referring to Table 2, in the case of Example 1, despite the evaporation of the anti-rust material, voids in the gasket were not large, so that the sealing function was confirmed to be effectively maintained as in the case of Comparative Example 1 in which an anti-rust material was not included. Meanwhile, in the case of Comparative Example 2 in which $NaNO_2$ was used as an anti-rust material, a number of large voids were present in the gasket, so that the sealing function was confirmed to be greatly deteriorated.

The invention claimed is:

1. A gasket for a secondary battery, the gasket comprising:
a base resin; and
a rust inhibitor,
wherein the base resin includes polybutylene terephthalate, and
the rust inhibitor includes an anti-rust material and a polymer resin, and
the base resin and the polymer resin are different, and the anti-rust material includes at least one of compounds of Formula 1-1 or Formula 1-2 below:

$$A_1\text{-}R_1 \quad \text{[Formula 1-1]}$$

$$A_1\text{-}R_2\text{-}A_2 \quad \text{[Formula 1-2]}$$

wherein, $R_1$ is any one selected from the group consisting of a linear alkyl group having 8 to 20 carbon atoms, a branched alkyl group having 8-20 carbon atoms, an alkenyl group having 8 to 20 carbon atoms, alkynyl group having 8 to 20 carbon atoms, and an aryl group having 8 to 18 carbon atoms, $R_2$ is any one selected from the group consisting of a linear alkylene group having 8 to 20 carbon atoms, a branched alkylene group having 8 to 20 carbon atoms, an alkenylene group having 8 to 20 carbon atoms, alkynylene having 8 to 20 carbon atoms, and an arylene group having 8 to 18 carbon atoms, and $A_1$ and $A_2$ are each independently any one selected from the group consisting of a carboxyl group, an amino group, a nitro group, a hydroxy group, and a fluorine group.

2. The gasket for the secondary battery of claim 1, wherein the anti-rust material comprises at least one of Formula 1-3 or Formula 1-4 below:

[Formula 1-3]

[Formula 1-4]

in Formula 1-3 and Formula 1-4, p is 4 to 10, and q is 3 to 6.

3. The gasket for the secondary battery of claim 2, wherein the anti-rust material comprises at least one selected from the group consisting of decanoic acid, lauric acid, and myristic acid.

4. The gasket for the secondary battery of claim 1, wherein the polymer resin comprises at least one of polyethylene or a copolymer which includes 2 or more derived units selected from the group consisting of an ethylene-derived unit, a propylene-derived unit, a butylene terephthalate-derived unit, an ethylene terephthalate-derived unit, and a methyl acrylate-derived unit.

5. The gasket for the secondary battery of claim 1, wherein the weight ratio of the polybutylene terephthalate to the rust inhibitor is 98:2 to 85:15.

6. The gasket for the secondary battery of claim 1, wherein the anti-rust material is present in the gasket by being dispersed in a size at an angstrom (Å) level.

7. The gasket for the secondary battery of claim 1, wherein the rust inhibitor is in a form of a pellet.

8. A secondary battery comprising:
an electrode assembly including a positive electrode and a negative electrode;
a can including a top opening;
a cap assembly coupled to the can by a crimping part which is formed on an upper outer circumferential surface of the can, wherein a portion of the top opening is bent inward to form the crimping part; and
a gasket of claim 1, wherein the gasket is interposed between the can and the cap assembly.

* * * * *